United States Patent [19]

Levie et al.

[11] Patent Number: 4,502,874

[45] Date of Patent: Mar. 5, 1985

[54] CONTINUOUS FILTRATION

[75] Inventors: Lewis A. Levie; Max J. Fowler, both of Charlotte, N.C.

[73] Assignee: Pneumafil Corporation, Charlotte, N.C.

[21] Appl. No.: 433,374

[22] Filed: Oct. 8, 1982

[51] Int. Cl.³ .................. B01D 46/04; B01D 35/12
[52] U.S. Cl. .................................. 55/283; 55/300; 55/312; 55/350; 210/102; 210/334
[58] Field of Search ............... 210/741, 791, 806, 102, 210/407, 334, 388; 55/283, 300, 302, 312, 350, 484

[56] References Cited

U.S. PATENT DOCUMENTS

| | | | |
|---|---|---|---|
| 1,775,304 | 9/1930 | Boesger | 55/300 |
| 2,606,344 | 8/1952 | Clark | 55/350 |
| 2,633,206 | 3/1953 | Bruckner | 55/283 |
| 3,385,033 | 5/1968 | Basore | 55/484 |
| 3,762,143 | 10/1973 | Stewart | 55/283 |
| 3,897,228 | 7/1975 | Berz | 55/350 |
| 4,010,013 | 3/1977 | Murayama | 55/350 |
| 4,353,721 | 10/1982 | Mollstätter | 55/283 |

FOREIGN PATENT DOCUMENTS 2829683  1/1980  Fed. Rep. of Germany ........ 55/283

Primary Examiner—Benoît Castel
Attorney, Agent, or Firm—Robert W. Fiddler

[57] ABSTRACT

Means are provided for continuous filtration of foreign matter from a fluid stream, without requiring a discontinuance of filtration to clean filter surfaces. The apparatus alternately directs the fluid to be filtered to one or another of a plurality of filter compartments, each containing a filter medium. Sensing means are provided to sense the condition of filter clogging in the compartments, and diverting means are provided to divert the flow of fluid to a compartment having a relatively clean filter, when a clogging condition is sensed. Thus, the fluid stream is always directed to a filtering compartment having relatively clean filter media therein. Additionally, means are provided for cleaning the filter medium in a compartment not being used.

3 Claims, 3 Drawing Figures

CONTINUOUS FILTRATION

BACKGROUND OF THE INVENTION

This invention relates to the art of filtration, and more particularly to improved means including method and apparatus permitting the continuous filtration of undesired material from a fluid stream, with no down-time of the filtration operation required to clean the filter medium.

A variety of apparatus and methods has been evolved for filtering undesired material from a fluid stream in which a filter medium is arranged in the fluid flow path to filter out this undesired material, while permitting the fluid to continue to flow. In order to effect complete filtration, it is necessary that all the fluid be directed through the filter medium. When the filter medium becomes clogged, it is necessary to discontinue filtration and to replace or clean the clogged filter medium. This slows down, and thus increases the expense of any operation in connection with which the filtered fluid is employed.

In order to decrease down-time for filter maintenance, filter compartments, and filter media areas have been made relatively large, thus increasing the capacity of the filter. This increase in capacity not only entails an increase in production and installation costs of the filter, but also increases space requirements.

BRIEF DESCRIPTION OF THE INVENTION

It is with the above considerations in mind that the present improved means have been evolved serving to permit continuous filtration of foreign material from a fluid, with no down-time of the filtration operation required to effect filter media cleaning and permitting the use of relatively small filter chambers and filter media.

It is accordingly among the primary objects of the invention to provide a continuously operating filter system for filtering foreign matter from a fluid stream.

Another object of the invention is to provide an improved apparatus for filtering foreign matter from a fluid stream on a relatively continuous basis with minimal down-time of the system.

It is also an object of the invention to provide filtration means of relatively small volumetric requirement, thus permitting installation in relatively confined areas.

These and other objects of the invention, which will become hereafter apparent are achieved by providing a plurality of alternately employable filter compartments coupled via branch ducts to a common duct, through which the fluid to be filtered is directed to the compartments. Diverting means are arranged to selectively deflect fluid flow from the common duct alternately to one or another branch duct, depending on the clogging condition of the filter in the compartment to which the branch duct is coupled, which is sensed by sensing means in the filter compartments. Fluid to be filtered is fed only to a compartment having a clean filter surface. After the fluid flow has been diverted from a compartment having a clogged filter, the clogged filter is cleaned and made ready to receive fluid during the next alternation of fluid flow to the compartment. The filter compartments are formed with selectively openable discharge openings through which the material filtered from the fluid stream may be discharged, and the filtered air is fed to a common air discharge duct.

A feature of the invention resides in the fact that a variety of different filter chambers, employing a variety of different filter media may be employed in practicing the invention, depending on the nature of the material to be filtered, and the available space.

Another feature of the invention resides in the fact that a plurality of filtration compartments may be arranged over a common collection hopper to receive the material filtered out by the filters in the different compartment, without interferring with the filtration action in the different compartments.

Another feature of the invention resides in the utilization of vibrators and/or reverse fluid flow streams to clean the filter media surfaces, without requiring the entry of an operator into the filter chambers.

A further feature of the invention resides in the fact that the filtration systems can permit filtration without requiring handling by operators of the filtered material.

BRIEF DESCRIPTION OF THE DRAWINGS

The particular details of the best mode contemplated for carrying out the invention and the manner and process of making and using same, so as to enable any person skilled in the art to make and use same, will be described in full, clear, concise and exact terms, in conjunction with the accompanying drawings, wherein.

DESCRIPTION OF PREFERRED EMBODIMENT OF THE INVENTION

Figure 1:
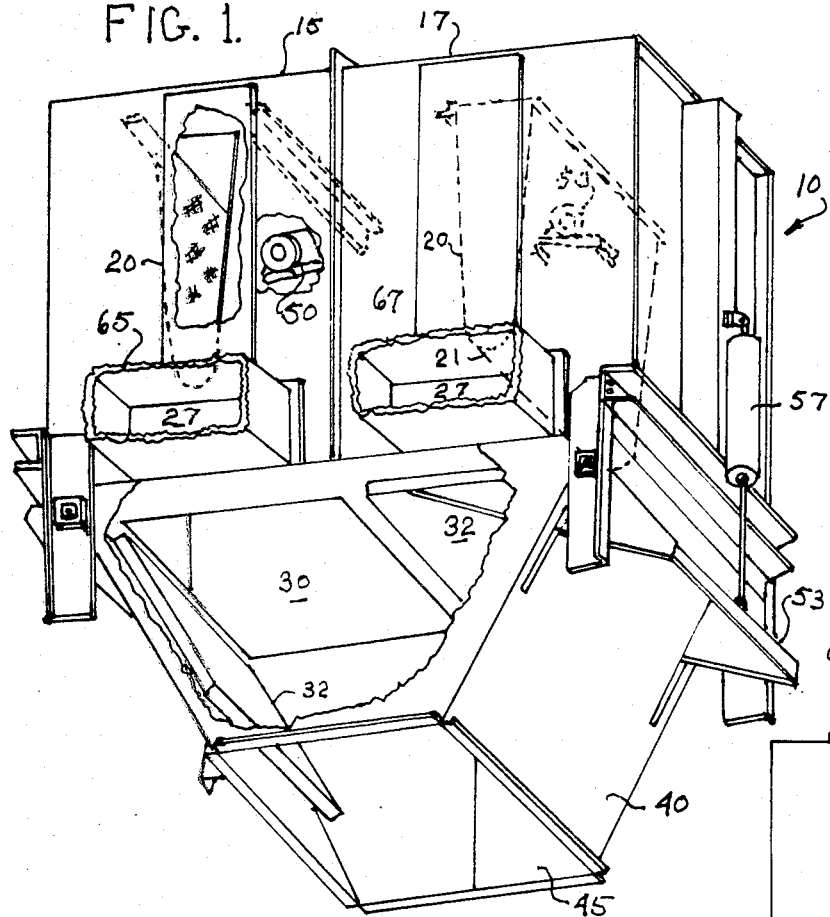
FIG. 1 is a front perspective view, with parts broken-away, looking up at two filter compartments arranged over a common hopper, showing a preferred embodiment of the invention arranged for cleaning lint laden air in a textile mill.

Referring now more particularly to the drawings, like numerals in the various FIGS. will be employed to designate like parts. As seen in the drawings, the invention is illustratively shown as embodied in a filter 10 for use in filtering lint laden air in a textile mill. The filter 10 is shown as comprising two filter compartments 15 and 17. These compartments are illustratively shown as of rectangular cross-section in both lateral and longitudinal planes, and are conveniently fabricated of sheet metal, employing conventional sheet metal forming techniques. Compartments 15 and 17 are shown as arranged as mirror images to facilitate their positioning in the illustrated embodiment.

Figure 3:
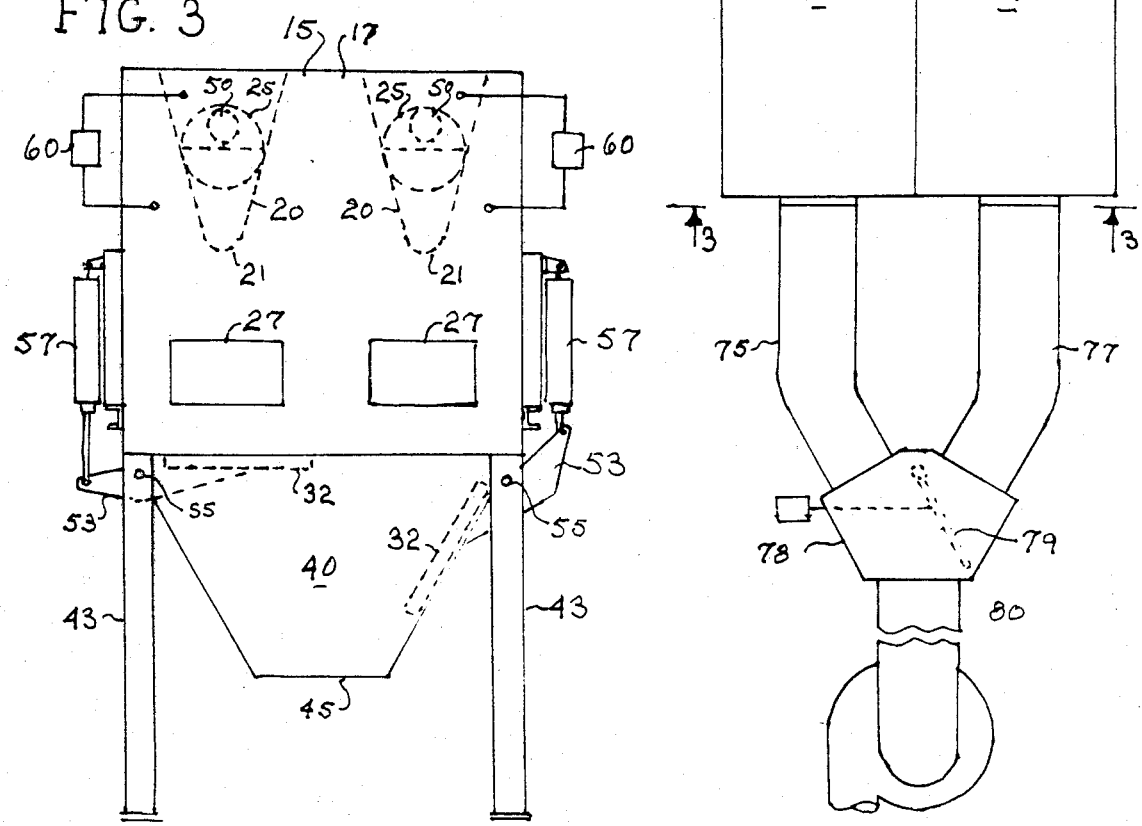
FIG. 3 is a schematic cross-sectional view on line 3—3 of FIG. 2.

Within each compartment 15 and 17, a filter medium 20 is arranged, illustratively shown as formed of a V-shaped screen, with a rounded downwardly facing apex 21. These screen filters 20 as best seen in FIG. 1 are dimensioned and arranged to extend from front to rear of their respective filter compartments 15 and 17. The spacing between the legs of the V of filter screen 20, as best seen in FIG. 3, is such as to encompass outlet opening 25 of each filter compartment. An air inlet opening 27 is formed in each filter housing, at a point externally of the filter screen 20, as best seen in FIGS. 1 and 3.

A filtered material discharge opening 30 is formed in the bottom of each filter compartment, as best seen in the lower end of compartment 15 to the left in FIG. 1, and a door 32 is pivotally mounted adjacent the lower end of compartments 15 and 17 to permit selective closing and opening of the discharge openings 30.

A hopper 40 is arranged beneath the filter compartments and like the filter compartments, is preferably fabricated of sheet metal, and dimensioned to extend over the discharge opening of all of the filter compartments employed in the filtration system. In the illustrated embodiment, the hopper is shown as formed with an open outlet end 45, which, as will be understood by those skilled in the art, is dimensioned so as to permit feeding of the hopper contents into a baler, truck or bin, as desired in the particular installation. The filter compartments 15 and 17 are illustratively shown in FIG. 3 as mounted on supporting legs 43, preferably one at each corner of the hopper 40 to support the hopper at a level above that of the ground, so as to facilitate the positioning of the truck or bin beneath the hopper, or to effect connection to a baler or other suitable collector for the material filtered out of the fluid stream by the apparatus.

Filter cleaning means are preferably provided to implement the cleaning of the filter media when it becomes clogged. As illustratively shown, when utilizing rigid filter screens 20, this can be most expeditiously accomplished by arranging a vibrator 50 to vibrate the screen. This vibrator may take a variety of forms, such as an eccentrically positioned cam on a rotating shaft, the cam surface engaging the filter surface, or an electromagnetically driven vibrator or the like. Similarly, as will be understood by those skilled in the art, the screen cleaning means may take the form of an air tube with orifices arranged to direct a blast of air from the interior of the screen to the exterior thereof to dislodge any clogging material from the filter surface.

The discharge opening doors 32 are shown in the illustrated embodiment as pivotally mounted on pivot arms 53 supported on pivot 55, with one end of pivot arm 53 attached to a solenoid driven piston assembly 57, to effect movement of the door in response to solenoid actuation.

Sensing means 60 are provided responsive to the build-up of material on the filter media. In the illustrated embodiment, the sensing means 60 are illustratively shown as formed by a pressure guage measuring the differential in pressure between the interior and exterior of the screen, and as understood by those skilled in the art, as the screen clogs, the pressure on the inlet side of the screen will rise while that on the interior of the screen will drop, with the resulting pressure differential indicating the degree of clogging.

Figure 2:
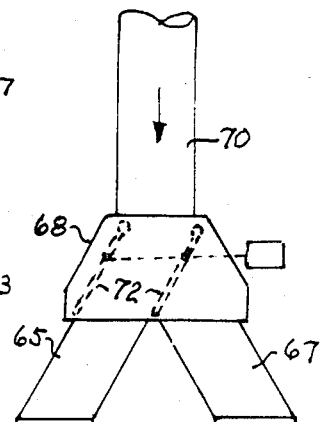
FIG. 2 is a top plan schematic view of apparatus, as shown in FIG. 1 arranged in the air flow line in a textile mill.

Filter compartments 15 and 17 are connected to branch inlet ducts 65 and 67 respectively, as best seen in FIG. 2, coupled to common supply duct 70, from which the fluid in this case, lint laden air, to be filtered is fed. Diverting means in the form of flapper plates 72 are positioned in the transition 68, between supply duct 70 and the branch ducts 65 and 67 to selectively direct the air from the supply duct 70 to either branch duct 65 or 67, depending on the positioning of the flappers 72, as illustratively shown in FIG. 2.

Coupled to the air outlets or openings 25 of filter compartments 15 and 17 are air discharge branch ducts 75 and 77, respectively, as seen at the lower end of FIG. 2, which connect via transition 78 to a common air discharge duct 80. The vane plate 79, showing a variant of deflectors 72 for controlling flow of air between a branch and a common duct is shown as formed of a single plate pivotally mounted, so as to selectively direct the air between either branch 75 or branch 77, and the discharge duct 80.

OPERATION

In use, the aforedescribed apparatus is fabricated and assembled as described, preferably utilizing conventional sheet metal fabricating techniques for forming the filter compartments and hopper, which are mounted in position as desired on supporting legs 43, and provided with filter screens 20, door operators 57, sensors 60, vibrators 50, and the like, all of which as recognized by those skilled in the art, are readily available components, subject to assembly as described and illustratively shown in the drawings.

In the illustrated embodiment, where the filtering means 10 have been shown embodied for use in filtering the air in a textile mill, the filter compartments are connected to the air supply duct 70 carrying the air to be filtered, via branch ducts 65 and 67, which are coupled to the intake opening 27 in the filter compartments. Similarly, branch air outlet duct 75 and 77 are coupled to the outlet openings 25 of the filter compartments, and transition into filtered air common discharge duct 80.

During an initial cycle of operation, diverting valve plates 72 are set to feed the supply air from duct 72 to filter compartment 15. The air fed to compartment 15 passes from the outside of screen 20 to the interior thereof, and out through discharge branch duct 75 to discharge duct 80.

When screen 20 in filter compartment 15 becomes clogged to a point where desired air flow is not being provided, the sensor 60 of compartment 15 indicates a pressure drop of undesirable magnitude between the exterior and interior of the screen. This sensed pressure differential, as understood by those skilled in the art, may be employed to produce an electrical signal actuating a solenoid in solenoid actuated piston assembly 57, associated with compartment 15, to move door arm 53 to open filtered material discharge door 32 of compartment 15, and actuate solenoid 57 associated with compartment 17 to close the door 32, and simultaneously to actuate a solenoid, or the like mechanism to move diverting plates 72 from the position shown in FIG. 2 leading to branch duct 65 to a position leading to branch duct 67, as will be understood by those skilled in the art. Simultaneously, vane 79 may be moved, by a solenoid or the like, to a position connecting the branch outlet duct 77 of filter compartment 17 to common air discharge duct 80.

After air flow has been directed to a filter compartment having clean unclogged filtering surfaces, the filter in the compartment to which air flow has been discontinued (17 in the described situation) is subject to being cleaned in the illustrated embodiment by energizing the vibrator, or by any other means for dislodging the material clogging the filter surfaces.

It is thus seen that continuous filtration is obtained by alternately employing one or another of a plurality of filters arranged to selectively receive air or the like fluid to be filtered, with cleaning taking place of the unused filters which are thereafter available to provide a new filter path when required.

The above disclosure has been given by way of illustration and elucidation, and not by way of limitation, and it is desired to protect all embodiments of the herein disclosed inventive concept within the scope of the appended claims.

We claim:

1. A fiber collector for continuously extracting and collecting fibers from the air handling system in a textile mill, said collector comprising:

a plurality of contiguous alternately employable filter compartments, each having an air inlet and air outlet, and a discharge opening;

a screen filter in each compartment between the air inlet and air outlet;

a common air supply duct having an air inlet end and air outlet end, said duct carrying the fiber laden air to the outlet end of said duct;

branch air supply ducts extending from said common air supply duct, one to the air inlet of each filter compartment;

a diverting vane between said common air supply duct and said branch ducts selectively positionable to feed air from the common duct to one or another of said branch air supply ducts;

a sensor in each filter compartment, sensing the clogging condition of said filter;

a coupling between said sensor and said diverting vane to change the position of said diverting vane upon sensing of the filter clogging condition;

a branch air discharge duct extending from the air outlet of each compartment to a common air discharge duct;

a common hopper arranged beneath the discharge openings of all said filter compartments;

a selectively openable door positioned over the discharge opening of each compartment; and vibrator filter cleaning means in each compartment actuated by said sensor.

2. A fiber collector as in claim 1, in which each door is movable by a piston solenoid assembly.

3. A fiber collector as in claim 1, in which said sensor is a pressure differential sensor sensing the difference in pressure on opposite sides of the screen filter.

* * * * *